US012136273B2

(12) United States Patent
Kabkab et al.

(10) Patent No.: US 12,136,273 B2
(45) Date of Patent: Nov. 5, 2024

(54) IDENTIFICATION OF REAL AND IMAGE SIGN DETECTIONS IN DRIVING APPLICATIONS

(71) Applicant: Waymo LLC, Mountain View, CA (US)

(72) Inventors: Maya Kabkab, Mountain View, CA (US); Yiran Zhang, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 368 days.

(21) Appl. No.: 17/451,558

(22) Filed: Oct. 20, 2021

(65) Prior Publication Data
US 2023/0119634 A1 Apr. 20, 2023

(51) Int. Cl.
G06V 20/58 (2022.01)
B60W 60/00 (2020.01)
G06F 18/2431 (2023.01)

(52) U.S. Cl.
CPC ......... G06V 20/582 (2022.01); B60W 60/001 (2020.02); G06F 18/2431 (2023.01); B60W 2420/403 (2013.01); B60W 2420/408 (2024.01); B60W 2420/54 (2013.01); B60W 2552/00 (2020.02)

(58) Field of Classification Search
CPC ............ G06V 20/582; B60R 2300/103; B60R 2300/106; B60R 2300/301; B60R 2300/804; B60R 2300/302
See application file for complete search history.

(56) References Cited

U.S. PATENT DOCUMENTS

| 9,558,411 B1 | 1/2017 | Ferguson et al. | |
| 2016/0117923 A1* | 4/2016 | Dannenbring | G06V 20/56 340/905 |
| 2018/0300565 A1* | 10/2018 | Qin | G08G 1/09626 |
| 2020/0278435 A1 | 9/2020 | Wang et al. | |
| 2020/0282924 A1* | 9/2020 | Slama | B60R 11/04 |
| 2021/0055375 A1 | 2/2021 | Smith | |
| 2022/0006936 A1* | 1/2022 | Raaijmakers | G08G 1/166 |
| 2023/0343108 A1* | 10/2023 | Hemantharaja | G06V 10/82 |

OTHER PUBLICATIONS

Extended European Search Report (EESR), for Application No. 22202688.2—Communication pursuant to Article 62 EPC (R. 63 EPC), dated Mar. 15, 2023, 12 pages.

* cited by examiner

Primary Examiner — Margaret G Mastrodonato
(74) Attorney, Agent, or Firm — Lowenstein Sandler LLP

(57) ABSTRACT

The described aspects and implementations enable efficient identification of real and image signs in autonomous vehicle (AV) applications. In one implementation, disclosed is a method and a system to perform the method that includes obtaining, using a sensing system of the AV, a combined image that includes a camera image and a depth information for a region of an environment of the AV, classifying a first sign in the combined image as an image-true sign, performing a spatial validation of the first sign, which includes evaluation of a spatial relationship of the first sign and one or more objects in the region of the environment of the AV, and identifying, based on the performed spatial validation, the first sign as a real sign.

20 Claims, 10 Drawing Sheets

IDENTIFICATION OF REAL AND IMAGE SIGN DETECTIONS IN DRIVING APPLICATIONS

TECHNICAL FIELD

The instant specification generally relates to autonomous vehicles. More specifically, the instant specification relates to improving autonomous driving systems and components using techniques that allow distinguishing real sign detections from image sign reflections during run-time operations of autonomous vehicles.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
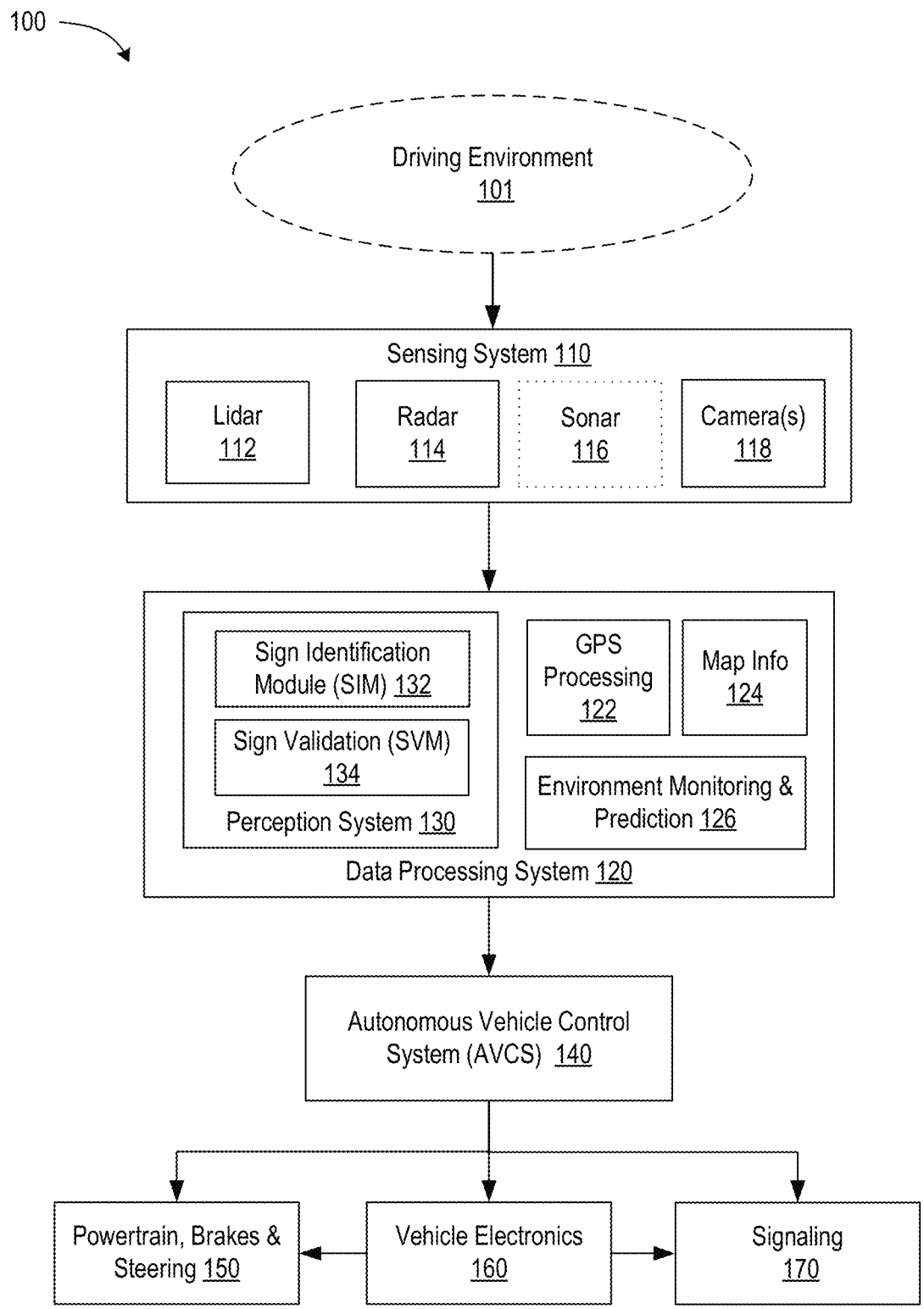
FIG. 1 is a diagram illustrating components of an example autonomous vehicle (AV) capable of performing efficient sign identification and validation, in accordance with some implementations of the present disclosure.

In one implementation, disclosed is a system that includes a sensing system of a vehicle, the sensing system being configured to obtain a combined image that includes a camera image of a region of an environment of the vehicle and a depth information for the region of the environment of the vehicle, wherein the depth information includes at least one of a lidar data, a radar data, a stereo image data, or an ultrasonic data. The system further includes a perception system of the vehicle, the perception system configured to classify a first sign in the combined image as an image-true sign, perform a spatial validation of the first sign, the spatial validation including evaluation of a spatial relationship of the first sign and one or more objects in the region of the environment of the vehicle, and identify, based on the performed spatial validation, the first sign as a real sign.

In another implementation, disclosed is a system that includes a sensing system of an vehicle, the sensing system configured to obtain a first data that includes a lidar data and a camera data for a first portion of a driving environment of the vehicle, the first portion depicting a first candidate sign, and obtain a second data that includes a lidar data and a camera data for a second portion of the driving environment, the second portion depicting a second candidate sign. The disclosed system further includes a perception system configured to process, using a machine-learning model (MLM), the first data to determine a first sign type of the first candidate sign; process, using the MLM, the second data to determine a second sign type of the second candidate sign; determine, based on the first sign type and the second sign type, that the first candidate sign is a mirror image of the second candidate sign; identify a reflecting surface located between a second candidate sign and the sensing system of the vehicle; identify that the second candidate sign is located within a tolerance region of a location that is a mirror image of a location of the first candidate sign with respect to the reflecting surface; and determine that the first candidate sign is a real sign and the second candidate sign is an image sign.

In another implementation, disclosed is a method that includes obtaining, using a sensing system of an vehicle, a combined image that includes a camera image of a region of an environment of the vehicle and a depth information for the region of the environment of the vehicle, wherein the depth information includes at least one of a lidar data, a radar data, a stereo image data, or an ultrasonic data; classifying a first sign in the combined image as an image-true sign;

performing a spatial validation of the first sign, the spatial validation including evaluation of a spatial relationship of the first sign and one or more objects in the region of the environment of the vehicle; and identifying, based on the performed spatial validation, the first sign as a real sign.

DETAILED DESCRIPTION

An autonomous vehicle can employ a radio detection and ranging (radar) technology and light detection and ranging (lidar) technology to detect distances to various objects in the environment and the velocities of such objects. A sensor (a radar or lidar) emits one or more radio wave (or laser) signals (e.g., pulses) that travel to an object and then detects arrived signals reflected from the object. By determining a time delay between the signal emission and the arrival of the reflected waves, a sensor can determine the distance to the object. A typical sensor emits signals in multiple directions to obtain a wide view of the outside environment. For example, a sensor (radar or lidar) can cover an entire 360-degree view by using a series of consecutive sensing frames identified with timestamps. As a result, each sector in space is sensed in time increments $\Delta\tau$, which are determined by the angular velocity of the sensor's scanning speed. Sometimes, an entire 360-degree view of the environment can be obtained over a full scan. Alternatively, any smaller sector, e.g., a 1-degree sector, a 5-degree sector, a 10-degree sector, or any other sector can be scanned, as desired.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame and to what types (e.g., cars, trucks, buses, motorcycles, pedestrians, road signs, trees, etc.) the objects in the frame belong.

Time-of-flight (ToF) sensors are typically used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" velocity. A coherent sensor allows associating a radial velocity with the return points of the point cloud. This additional information (which can be obtained separately or together with the range information) helps the sensing system of the autonomous vehicle to identify the state of the motion of various objects. Additionally, lidar returns vary in intensity depending on the type of the reflecting surface (e.g., a window of a car vs. a door of the car, a black portion of a traffic sign vs. a white portion of the traffic sign) and, therefore, allow at least some imaging of the sensed objects.

A camera (e.g., a photographic or video camera) allows a high resolution of objects at both shorter and longer distances, providing a projection of a three-dimensional space onto a two-dimensional image plane (or some other non-planar surface). Camera images can be processed by object/text recognition software that, among other things, identifies objects having important semantic information, such as markings on a road pavement (e.g., boundaries of driving lanes, locations of stopping lines, etc.) and traffic signs. For example, the object/text recognition software can process an image of a road intersection and identify the presence of a stop sign at the entry to the intersection, a sign forbidding a U-turn, a sign indicating that the vehicles traveling in the right lane must make a right turn, a sign indicating that the right lane after the intersection is reserved for buses, and so on. Timely and correct identification of traffic signs is important for safe autonomous driving and compliance with driving laws and regulations.

Identification of signs, however, is sometimes confounded by reflections from various surfaces that can be present in a driving environment. For example, a real sign can accompanied by an image of the real sign (referred to as an image sign or an image reflection throughout this disclosure) created by a sufficiently smooth reflecting surface, such as a window of a vehicle, a painted glossy side panel of a bus, a window of a building, a glass wall of a bus stop, and the like. Image signs, when identified as real signs, can lead to dangerous errors in selecting a driving path of the autonomous vehicle. For example, a real sign indicating that the traffic must make a right turn can generate its mirror image (e.g., upon reflection from a bus travelling in the vicinity of the autonomous vehicle) that indicates that the traffic must make a left turn. If the autonomous vehicle identifies the image sign as real and makes the left turn, a dangerous situation might ensue that can result in a collision.

The existing sign recognition technology uses a variety of techniques to identify image signs. For example, a lidar return (lidar signal reflection) from an apparent sign (candidate sign) can be compared with neighboring returns (returns from angles that are slightly different from the directions to the sign). If the neighboring returns indicate the presence of an object that is closer than the apparent sign, such an object is identified as the reflecting surface and the apparent sign as an image sign. Such an approach, however, is prone to classifying real signs as reflections (false negatives). For example, the neighboring returns can be from an engine exhaust, a dust cloud, or a body of a passing car.

Another technique includes evaluating a degree of smoothness of the reflecting surface, with smooth reflecting surfaces favoring determination of apparent signs to be reflections. This method, however, is not very reliable. Very smooth (and thus mostly specular) reflecting surfaces can have little diffuse reflection that would be necessary for the lidar signal to reflect back to the lidar, as the direction of the lidar signal incidence is, generally, different from the direction that is perpendicular to the reflecting surface.

Aspects and implementations of the present disclosure address these and other shortcomings of the existing sign detection technology by enabling methods and systems that quickly and reliably classify candidate road signs as real signs or reflections. Various implementations of the present disclosure describe a sign identification and validation system that uses one or more machine-learning models (MLMs) to classify various candidate signs as image-true signs or image-false signs. Image-true signs are signs that have valid mirror image counterparts (e.g., a left arrow sign has a valid right arrow sign as the mirror image counterpart). Image-false signs are signs that do not have valid mirror image counterparts (e.g., a "No-U Turn" sign does not have a valid mirror image counterpart). The signs that are classified as image-false signs can be determined to be real signs. The signs that are classified as mirror images of image-false signs can be determined to be reflections. The signs that are classified as image-true signs can be either real signs or reflections and can, therefore, be directed for further spatial validation processing. Spatial validation processing can include verifying whether any other detected object obscures a direct view of the apparent sign (with the presence of such an object favoring, though not being determinative of, an image sign). Spatial validation can further include determining if there is another sign located within the same or nearby region that can plausibly be a source of the image (with the existence of such a sign favoring a determination of an image sign). In some implementations, spatial validation can include using additional machine-learning models, accessing roadway mapping information, and the like. Advantages of the described implementations include fast and accurate classification of signs in autonomous vehicle applications. Such improved perception of autonomous vehicles translates into a safer and traffic rule-compliant autonomous driving.

Although, for brevity and conciseness, various systems and methods are described in conjunction with autonomous vehicles, similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, fast and accurate classification of signs can be used to inform the driver of the detected real and image signs (e.g., in Level 2 systems), with the driver making the ultimate driving decisions, or to make certain driving decisions (e.g., in Level 3 systems), such as ignoring image signs, without requesting a feedback from the driver.

FIG. 1 is a diagram illustrating components of an example autonomous vehicle (AV) 100 capable of performing efficient sign identification and validation, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate identification and validation (verification) of detected signs using camera and lidar data, including a sign identification module (SIM) 132 that can be used to identify a type of a sign detected by sensing system 110 and a sign validation module (SVM) 134 that can be used to determine whether the identified sign is a real sign or a sign reflection. The data processed by SIM 132 and SVM 134 can include images obtained by camera(s) 118 and intensity of lidar reflections (returns). The data can be obtained for a region of a driving environment 101 of the AV 100. More specifically, in some implementations, SIM 132 can receive cropped portions of camera and lidar images of the region and process the cropped portions using a machine-learning model (MLM) to identify a type of the sign, e.g., a stop sign, a sign that prescribes (or prohibits) a direction of motion, a sign that imposes a minimum/maximum speed, and so on. The output of SIM 132 can be used to identify a class to which the observed sign belongs.

Figure 2:
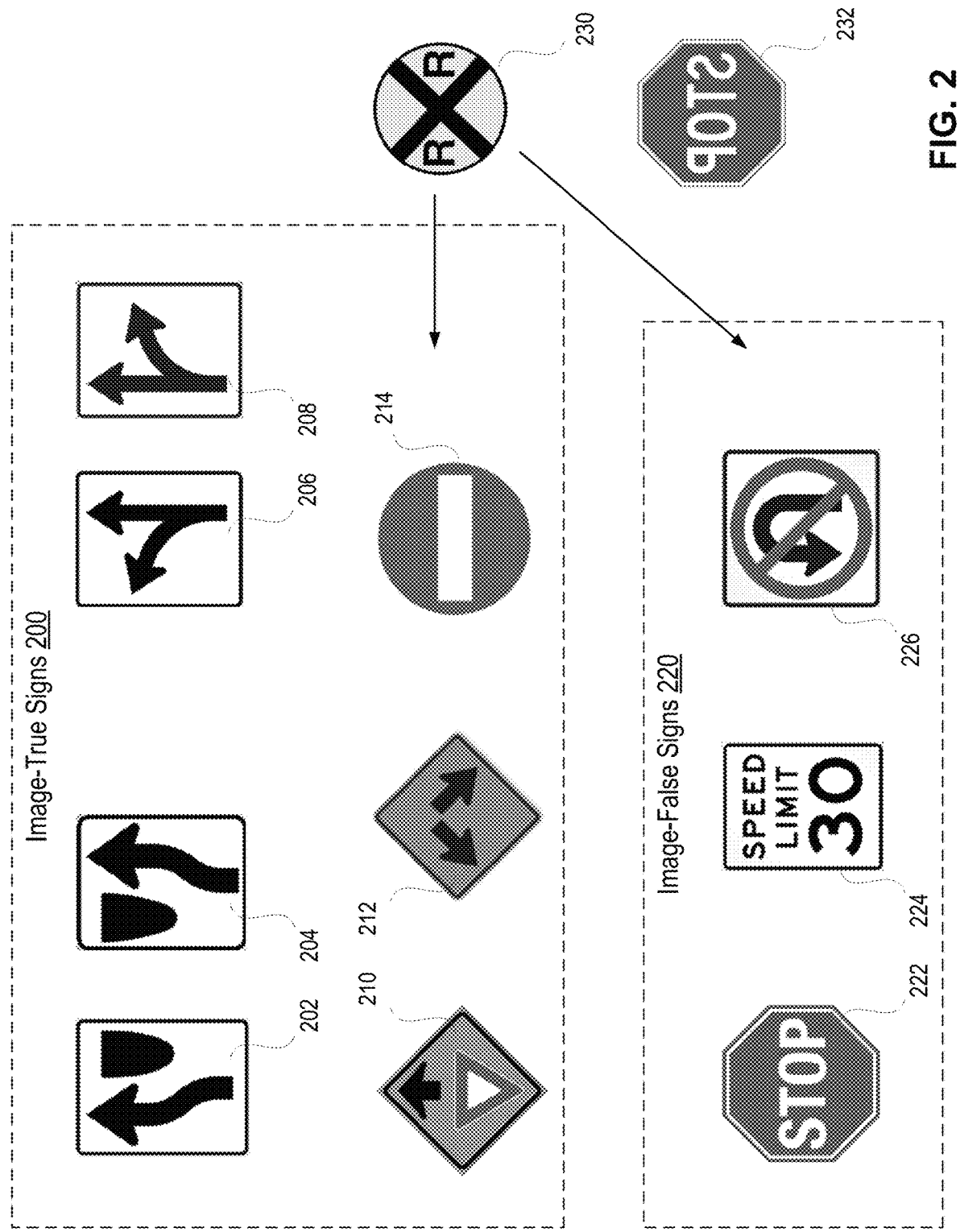
FIG. 2 illustrates an example sign classification that can be used by a sign identification module of the perception system of a vehicle operating in accordance with some implementations of the present disclosure.

FIG. 2 illustrates an example sign classification that can be used by a sign identification module of the perception system of a vehicle operating in accordance with some implementations of the present disclosure. Image-true signs 200 can include asymmetric signs, e.g., signs 202-208, whose mirror image is another valid sign, and symmetric signs, e.g., signs 222-226 whose mirror image coincides with the original sign. For example, image-true signs "Keep Left" 202 and "Keep Right" 204 are mirror images of each other. Similarly, image-true signs "Go Straight or Left" 206 and "Go Straight or Right" 208 are mirror images of each other. Signs "Yield Sign Ahead" 210, "Keep Left or Right" 212, and "Do Not Enter" 214 are symmetric signs. Image-false signs 220 include signs whose mirror image is an invalid sign. For example "Stop" sign 222, "Speed Limit" sign 224, and "No U-Turn" sign 226 are image-false signs. In some implementations, classification of the signs can depend on lidar resolution, visibility conditions, and the like. For example, "Railroad Crossing" sign 226 while being asymmetric (and, therefore, belonging to the class of image-false signs 220), can sometimes nonetheless be classified as an image-true sign, e.g., if resolution of letters "R" is insufficient to determine their orientation.

Referring back to FIG. 1, SIM 132 performs initial identification of an observed candidate sign and classifies the candidate sign among a number of classes. Class A includes signs that are image-false. Upon making a determination that the observed sign is image-false, SIM 132 can identify that the sign is real. Class B includes signs whose mirror image is an image-false sign. Having determined that the observed sign belongs to class B, SIM 132 can identify the sign as a reflection and not a real sign. For example, SIM 132 can determine that sign 232 is a mirror image of image-false "Stop" sign 222 and identify sign 232 as an image sign (reflection). Class C includes signs that are image-true. Observed signs that are classified as image true can be further processed by SVM 134 that makes the ultimate determination about the nature of the sign (e.g., real or image) based on the available spatial context, as described in more detail below. In those instances where confidence level of the classification SIM 132 is low (e.g., below a certain empirically-tested threshold), questionable signs can be classified as image-true signs and provided for subsequent validation by SVM 134.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animate objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animate objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with SIM 132 and SVM 134. Although not depicted explicitly in FIG. 1, in some implementations, SIM 132 and SVM 134 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 3:
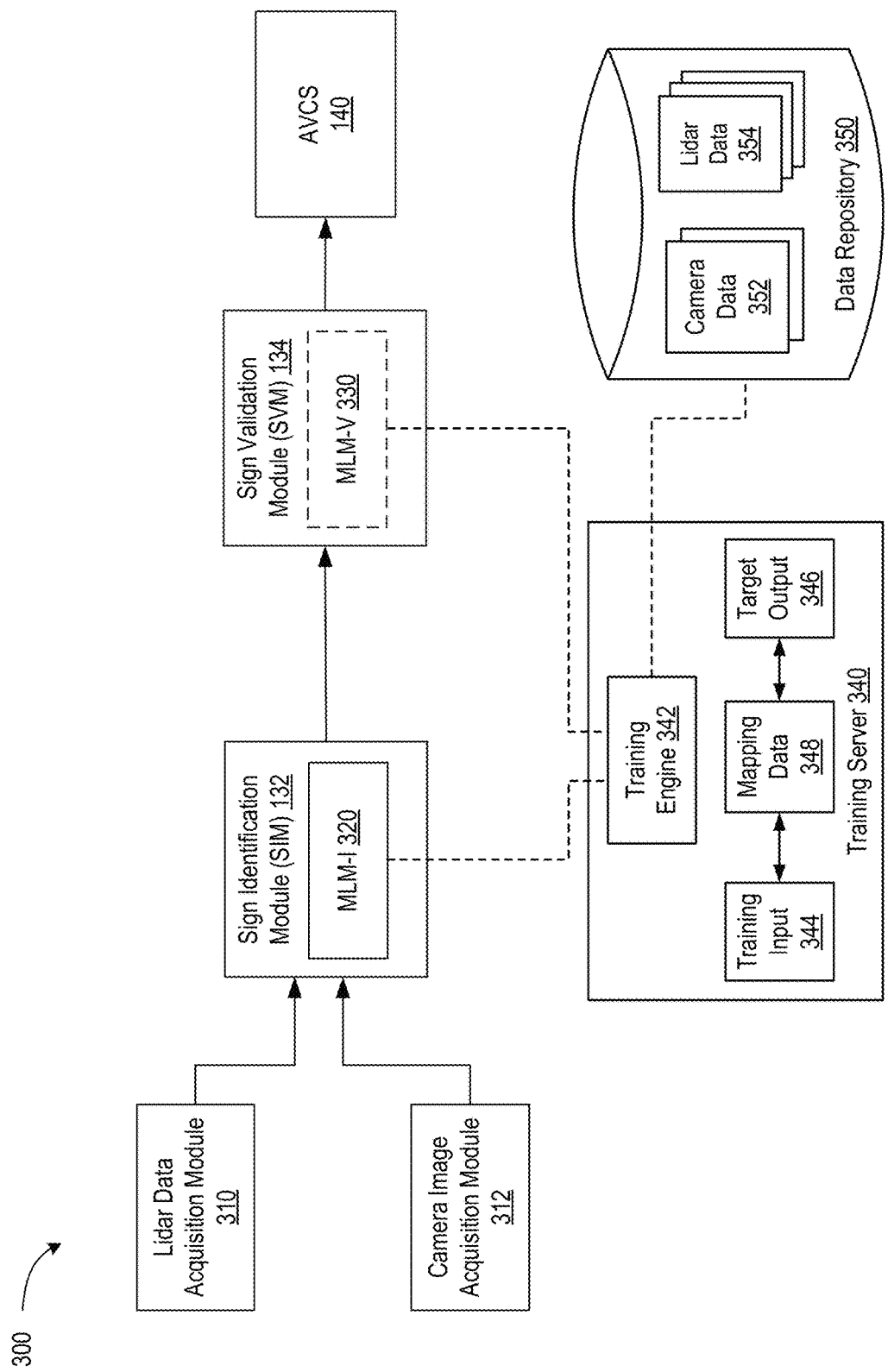
FIG. 3 is a diagram illustrating example architecture of a part of a perception system of a vehicle that is capable of efficient sign identification and validation, in accordance with some implementations of the present disclosure.

FIG. 3 is a diagram illustrating example architecture 300 of a part of a perception system of a vehicle that is capable of efficient sign identification and validation, in accordance with some implementations of the present disclosure. An input into the perception system (e.g., perception system 130 of FIG. 1) can include data obtained by sensing system 110 (e.g., by lidar 112 and camera(s) 118), such as distance data, radial velocity data, camera pixel data, etc. For example, a lidar data acquisition module 310 can provide lidar data that can include the lidar intensity map $I(R, \theta, \phi)$, where $R, \theta, \phi$ is a set of spherical coordinates. In some implementations, Cartesian coordinates, elliptic coordinates, parabolic coordinates, or any other suitable coordinates can be used instead. The lidar intensity map identifies an intensity of the lidar reflections for various points in the field of view of the lidar. The coordinates of objects (or surfaces of the objects) that reflect lidar signals can be determined from directional data (e.g., polar $\theta$ and azimuthal $\phi$ angles in the direction of radar transmissions) and distance data (e.g., radial distance R determined from the ToF of radar signals). The lidar data can further include velocity data of various reflecting objects identified based on detected Doppler shift of the reflected signals. Lidar Doppler data can be used in identifying the signs (e.g., for filtering non-sign returns), as signs of interest (e.g., traffic signs) can be expected to be stationary relative to Earth. Although FIG. 3 (and FIGS. 4A-B) reference lidar data, in some implementations, various other data that provide depth information about objects can be used instead or in addition to the lidar data. For example, depth information can include radar data obtained using one or more radar(s) 114 or ultrasonic data obtained using sonar 116. Depth information can further include stereo image data, e.g., data obtained by multiple camera(s) 118 from various vantage points. Depth information can further include any combination of the aforementioned data.

A camera image acquisition module 312 can acquire a sequence of images. Each image can have pixels of various intensities of one color (for black-and-white images) or multiple colors (for color images). Images acquired by camera image acquisition module 312 can be panoramic images or images depicting a specific portion of the driving environment, such as a large (e.g., panoramic) image segmented into smaller images.

SIM 132 can process outputs of lidar data acquisition module 310 and camera image acquisition module 312. SIM 132 can combine the lidar data and the camera data for a particular region of interest, e.g., corresponding to a forward-looking field of view, and select one or more portions of the region of interest that contain images of signs. The term a "sign," as used herein, should be understood as any object that has a semantic information, such as any traffic sign, including but not limited to warning signs, priority signs, prohibitory signs, mandatory signs, direction signs, information signs, and the like. "Sign" can further include any carrier of a semantic information, such as a vehicle e.g., with words "Police," "Ambulance," "Fire Department," "Taxi," etc. inscribed thereon. Signs can further include billboards, retail store signs, names of governmental, commercial, and residential buildings, and the like.

Cropped portions of the region of interest can be processed by one or more MLMs, e.g., a sign-identification MLM (MLM-I) 320. MLM-I 320 can identify a class for one or more of the candidate signs depicted in the images of the region of interest. MLM-I 320 deployed by SIM 132 can include decision-tree algorithms, support vector machines, deep neural networks, and the like. Deep neural networks can include convolutional neural networks, recurrent neural networks (RNN) with one or more hidden layers, fully connected neural networks, long short-term memory neural networks, Boltzmann machines, and so on.

The perception system can also include SVM 134 that can receive images of signs that have not been classified as image signs by SIM 132. SVM 134 can evaluate geometric information related to the location of the candidate signs in the broader context of the region of interest. More specifically, SVM 134 can identify another sign (counterpart sign) whose reflection from some reflecting surface can appear as the observed candidate sign. In other instances, SVM 134 can identify that no such sign is present in the driving environment of the AV. Based on such multiple geometric checks, SVM 134 can perform a final determination as to the nature (e.g., real sign or image reflection) of various signs detected in the driving environment of the AV. In some implementations, SVM 134 can deploy one or more additional MLMs, e.g., a sign-validation MLM (MLM-V 330) to assist in the final determination. Locations and semantic meanings of various signs that are determined to be real can be provided to AVCS 140. AVCS 140 charts or adjusts the current driving trajectory (driving path) of the AV in view of the location and meaning of the detected real signs, e.g., performs a maneuver that is mandated or allowed by the traffic signs, abstains from a forbidden maneuver, chooses a speed regime, follows a prescribed order of vehicle travel through an intersection, and so on.

MLM-I 320 and/or MLM-V 330 can be trained using actual camera images and lidar data depicting real signs and image reflection of real signs by various objects (vehicles, buildings, structures, bodies of water, etc.). Training images can be annotated with ground truth, which can include correct identification of signs as real or image, e.g., based on a human input. Training can be performed by a training engine 342 hosted by a training server 340, which can be an outside server that deploys one or more processing devices, e.g., central processing units (CPUs), graphics processing units (GPUs), etc. In some implementations, MLM-I 320 and/or MLM-V 330 can be trained by training engine 242 and subsequently downloaded onto the perception system 130 of the AV 100. MLM-I 320 and/or MLM-V 330, as illustrated in FIG. 3, can be trained using training data that includes training inputs 344 and corresponding target outputs 346 (correct matches for the respective training inputs). During training of MLM-I 320 and/or MLM-V 330, training engine 342 can find patterns in the training data that map each training input 344 to the target output 346.

Training engine 342 can have access to a data repository 350 storing multiple camera images 252 and instances of lidar data 354 for actual driving situations in a variety of environments. During training, training engine 342 can select (e.g., randomly), as training data, a number of camera images 352 and sets of lidar data 354. Training data can be annotated with correct sign identifications. In some implementations, annotations can be made by a developer before the annotated data is placed into data repository 350. Annotated training data retrieved by training server 340 from data repository 350 can include one or more training inputs 344 and one or more target outputs 346. Training data can also include mapping data 348 that maps training inputs 344 to the target outputs 346. In some implementations, mapping data 348 can identify a real sign and its image reflection within a given camera image and accompanying lidar data. The mapping data 348 can include an identifier of the training data, location of the real sign, location of the image reflection of the sign, distance to the sign and the sign's image reflection, type of the sign, and other suitable information.

During training of MLM-I 320 and/or MLM-V 330, training engine 342 can change parameters (e.g., weights and biases) of various models of MLM-I 320 and/or MLM-V 330 until the models successfully learn how to predict correct identification and validation of candidate signs (target outputs 346). In some implementations, MLM-I 320 and/or MLM-V 330 can be trained separately. In some implementations, MLM-I 320 and/or MLM-V 330 can be trained together (e.g., concurrently). Different models can have different architectures (e.g., different numbers of neuron layers and different topologies of neural connections) and can have different settings (e.g., activation functions, etc.).

The data repository 350 can be a persistent storage capable of storing lidar data, camera images, as well as data structures configured to facilitate accurate and fast identification and validation of sign detections, in accordance with various implementations of the present disclosure. The data repository 350 can be hosted by one or more storage devices, such as main memory, magnetic or optical storage based disks, tapes or hard drives, NAS, SAN, and so forth. Although depicted as separate from training server 340, in an implementation, the data repository 350 can be a part of training server 340. In some implementations, data repository 350 can be a network-attached file server, while in other implementations, data repository 350 can be some other type of persistent storage such as an object-oriented database, a relational database, and so forth, that can be hosted by a server machine or one or more different machines accessible to the training server 340 via a network (not shown in FIG. 3).

Figure 4A:
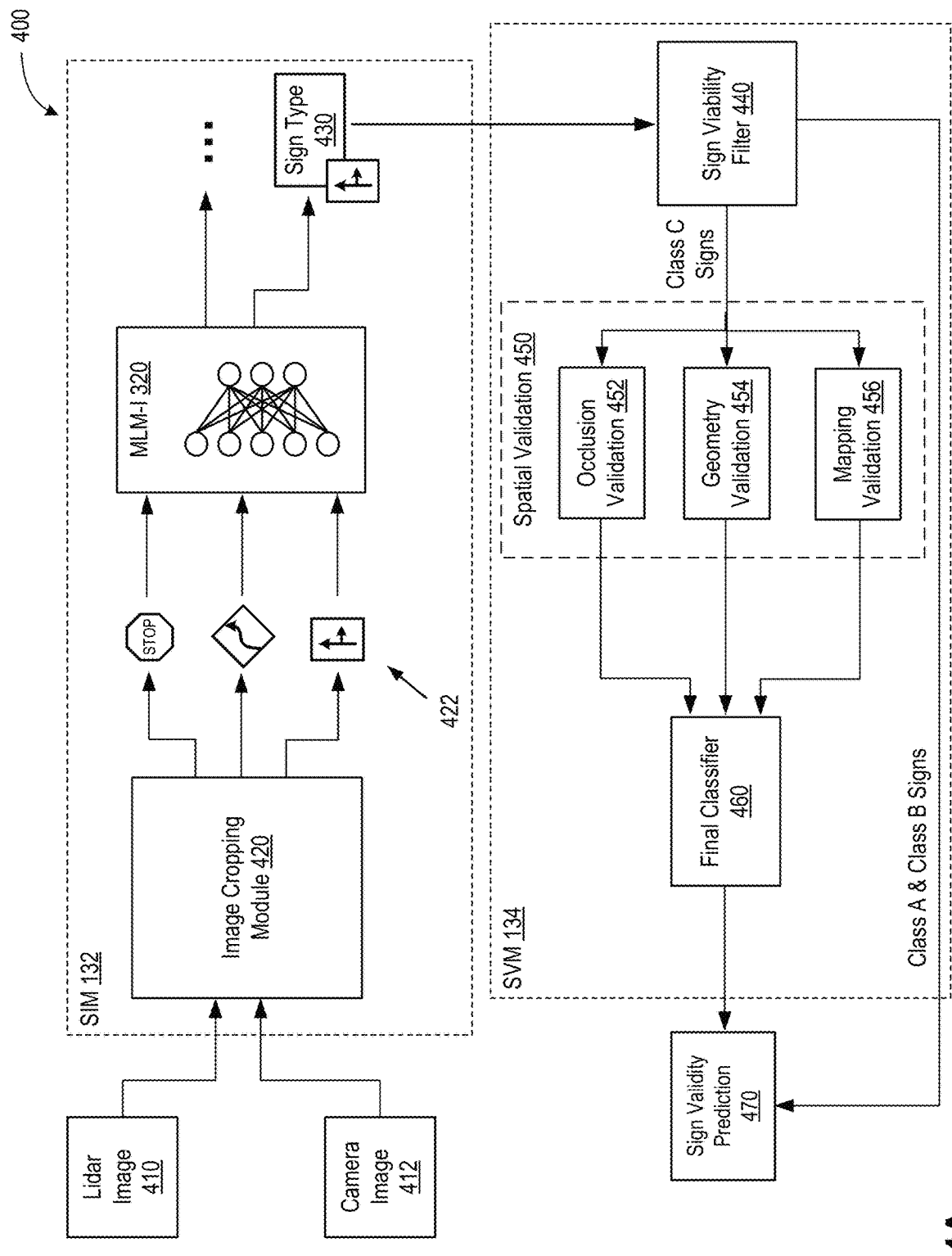
FIG. 4A is a schematic diagram illustrating example sign identification and validation operations used by a lidar of a vehicle for efficient and reliable detection of signs, in accordance with some implementations of the present disclosure.

FIG. 4A is a schematic diagram illustrating example sign identification and validation operations 400 used by a lidar of a vehicle for efficient and reliable detection of signs, in accordance with some implementations of the present disclosure. Operations 400 can be performed by SIM 132 and SVM 134 of the perception system 130 of FIG. 1. In one implementation, operations 400 can include one or more MLMs. Operations 400 can use one or more lidar images 210 and one or more camera images 412. Lidar image(s) 410 and camera image(s) 412 can depict the same region of the driving environment of the AV, e.g., covered by a field of view (FoV) of a front camera of the AV, although any other FoV (e.g., FoV of a side camera) can be processed in a similar manner.

Lidar image 210 (or some other depth information) can include a three-dimensional (3D) intensity of reflected lidar signals $I(x_1,x_2,x_3)$ or a two-dimensional (2D) projection of the 3D intensity, $I(x_1,x_2)$. The 2D intensity can represent a particular slice of the 3D intensity for a specific height $x_3$=h above the ground, e.g., $I(x_1,x_2,h)$, or a maximum value with respect to the vertical coordinate, $I(x_1,x_2)=\{I(x_1,x_2,x_3): x_3\}$, or an average value of $I(x_1,x_2,x_3)$ within some interval of heights, $x_3\in(a,b)$, or some other suitable value. In some implementations, a 3D-dimensional Doppler intensity or velocity map $V(x_1,x_2,x_3)$ or its 2D projection (e.g., determined as described above fin relation to the intensity I) can be a part of lidar image 210. The intensity (and/or velocity) map can be pixelated in any suitable way. It should be understood that coordinates $(x_1,x_2,x_3)$ or $(x_1,x_2)$ are not limited to Cartesian coordinates and can include any suitable system of coordinates, e.g., spherical coordinate system, cylindrical coordinate system, elliptical coordinate system, polar coordinate system, and so on. In some implementations, a coordinate system can be a non-orthogonal coordinate system, e.g., an affine coordinate system. In some implementations, depth information can also include radar data obtained using one or more radar(s) 114, ultrasonic data obtained using sonar 116, stereo image data, e.g., data obtained by camera(s) 118 positioned at multiple vantage points, or any combination thereof.

Camera image(s) 412 can be in any suitable digital format (JPEG, TIFF, GIG, BMP, CGM, SVG, and so on). In some implementations, locations depicted in camera image 412 can be referenced to location depicted in lidar image 410. For example, correspondence of the FoV of the lidar and the FoV of the camera can be obtained based on the known directions of the lidar transmitter and the optical axis of the camera, which can vary with time during the process of scanning of the driving environment. In some implementations, correspondence of the FoV of the lidar and the FoV of the camera can take into account a parallax between the lidar sensor and the camera objective, compensate for the rolling shutter of the camera, correct for time differences between detection of various lidar returns, and so on.

Camera image(s) 412 can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images 412 can be preprocessed, e.g., downscaled (with multiple pixel intensity values combined into a single pixel value), upsampled, filtered, denoised, and the like.

Image cropping module 420 can identify one or more sign locations in lidar image 410 and camera image 412 that are associated with candidate signs. More specifically, image cropping module 420 can include an object identification MLM (not depicted in FIG. 4A) trained to identify regions that include signs of interest, e.g., traffic signs. In some implementations, object identification MLM can operate on a combined image that includes lidar image 410 and camera image 412. In some implementations, pixels of lidar image 410 and pixels of camera image 412 can be used as separate inputs into the object identification MLM. In some implementations, object identification MLM can identify patches of interest (that depict signs) only in camera image 412 (or only in lidar image 410). Subsequently, image cropping module 420 can identify, using geometric correspondence, respective patches in lidar image 410 (or camera image 412) and associate the two sets of identified patches with each other.

Pairs of associated patches depicting various candidate signs 422 can be input into MLM-I 320 that performs identification of candidate signs and determines a sign type 430 of each candidate sign. In some implementations, MLM-I 320 can be or include a neural network of artificial neurons. The neurons can be associated with learnable weights and biases. The neurons can be arranged in layers. Some of the layers can be hidden layers. MLM-I 320 can include multiple hidden neuron layers and can be configured to perform computations that enable identification of candidate signs. In some implementations, MLM-I 320 can include a number of convolutional layers to extract local and global context of the image of the candidate sign(s) 422. Convolutional layers can use any suitable parameters, including kernel/mask size, kernel/mask weights, sliding step size, and the like. Convolutional layers can alternate with padding layers and can be followed with one or more pooling layers, e.g., maximum pooling layers, average pooling layers, and the like. Some of the layers of MLM-I 320 can be fully-connected layers. In some implementations, MLM-I 320 can be fully-convolutional or fully-connected. Sign types 430 can be output for each candidate sign 422. Multiple candidate signs 422 can be processed sequentially or in parallel, e.g., using multiple copies of MLM-I 320, or using a pipelined processing that utilizes a fewer number (e.g., one or two) of instances of MLM-I 320.

Sign types 430 can include a detailed identification of the type of a respective candidate sign 422, such as "Speed Limit 30 mph," "School Zone," "No Parking," "Right Lane Must Turn Right," "Left Lane is Closed Ahead," and the like. In some implementations, MLM-I 320 can perform identification using multiple stages, each stage corresponding to a separate MLM that can be trained individually. For example, a first subsystem of MLM-I 320 can identify a high-level category to which candidate signs 422 belong, such as "speed limit," "construction zone sign," "direction sign," "restriction sign," "information sign," and so on. Signs within each category can be closer to appearance (e.g., in form, color scheme, type of symbols painted thereon) to each other that to signs of other categories. For example, construction zone signs can have orange coloring, speed limit signs can be white rectangles with words that are common to the whole category of similar signs (e.g., "SPEED LIMIT"), highway information signs can have a green background, and so on. A second subsystem of MLM-I 320 (or a set of multiple subsystems of MLM-I 320, each trained on signs belonging to a particular category) can then perform a more accurate (low-level) identification of a sign type, e.g., to distinguish a "30 mph Speed Limit" sign from "25 mph Speed Limit" sign or a "Keep Right" sign from a "Keep Left" sign, and the like.

Input into MLM-I 320 (or any of its subsystems) can be a combination of lidar data and camera image data. More specifically, a lidar patch and a camera patch associated with a specific candidate sign 422 can be mapped on each other, rescaled, denoised, filtered, pixelated, upsampled, and/or preprocessed in any other suitable way. In some implementations, the distances to candidate signs 422 measured by lidar can be used for mapping of a lidar patch to a camera patch. A candidate sign 422 can be represented by a patch of W×H size, where W is the width of the patch and H is its height (with both W and H measured, e.g., in pixels). In some implementations, the size of the patch can be rescaled to fixed dimensions W×H even if the distance to candidate sign 422 varies in different driving situations.

Input into MLM-I 320 (or any of its subsystems) can be include a suitably pixelated lidar intensity $I_L(x,y)$ for each pixel location (x,y) within the patch, as well as a camera intensity, e.g., black-and-white intensity $I_{BW}(x,y)$, or a plurality of color intensities, e.g., red color intensity $I_L(x,y)$, green color intensity $I_G(x,y)$, and blue color intensity $I_B(x,y)$. In some implementations, a vector of intensities, e.g., $\hat{I}=[I_L,I_R,I_G,I_B]$ or $\hat{I}=[I_L I_{BW}]$ can be formed and input into MLM-I 320 (or its first subsystem). MLM-I 320 can include a number of convolutional layers that apply kernels (masks) to the input vectors $\hat{I}(x,y)$. Some of the kernels can be applied to same-type components for different pixels (e.g., within a neighborhood of pixels defined by the size of the kernel), e.g., to compute convolutions involving $I_L(x,y)$ and $I_L(x',y')$. Some of the kernels can be applied to different-type components for the same pixels, e.g., to compute convolutions involving $I_L(x,y)$ with $I_{BW}(x,y)$. Some of the kernels can be applied to different-type components for different pixels, e.g., to compute convolutions involving $I_L(x',y')$ with $I_G(x',y')$.

In some implementations, in addition to an image patch for each candidate sign 422, image cropping module 420 can generate a mirror image patch in which the lidar image (and, similarly, the camera image) of candidate sign 422 is a mirror reflection of itself. The generated mirror reflections can be reflections in the horizontal direction (e.g., to facilitate detection of image reflections from vehicle windows or building walls). In some implementations, the mirror reflections can be reflections in the vertical direction (e.g., to facilitate detection of image reflections from bodies of water). MLM-I 320 can process the mirror image patch similarly to how the original patch is processed. As a result, in some instances where MLM-I 320 does not recognize candidate sign 422 as a sign of a valid sign type, MLM-I 320 can identify the candidate sign as a mirror image of a valid sign type.

In addition to a sign type 430 for each of input candidate sign 422, the output of MLM-I 320 can include a confidence level in the sign type 430. The confidence level can also be a percentage value (e.g., 80% confidence) or a value within some other scale (e.g., 1-5 or any other scale). The confidence level can be determined, for example, by introducing an additional noise into lidar and camera intensities that are used as an input into MLM-I 320 and measuring robustness of the inferred sign type 430, with inferences that remain more stable against added noise assigned higher confidence levels and inferences that change more substantially assigned lower confidence levels.

MLM-I 320 (or any of its subsystems) can be trained using a variety of training images that can include some or all of the following: i) high-quality reference images of signs, ii) real lidar and camera images taken during actual driving or testing missions under a variety of atmospheric conditions (e.g., clear sunny weather, overcast weather, rainy or foggy conditions, and so on), iii) image sign reflections taken during laboratory or field testing, and so on. Training of MLM-I 320 (or any of its subsystems) can be performed using one or more training sets. Each training set can include a camera image of a region of a driving environment and a corresponding to this region lidar data. During training, incorrectly determined sign types 430 can be used to adjust weights and biases of MLM-I 320 (or any of its subsystems) by backpropagating errors through the neuron layers of MLM-I 320. More specifically, weights and biases of MLM-I 320 can be modified until a given candidate sign 422 within a specific training set is identified correctly. The process can be repeated for other candidate signs 422 of the same training set. Subsequently, a new training set can be selected and various candidate signs 422 of the new set can be classified with neural network parameters being changed again until a successful identification of at least a target portion of candidate signs 422 in the new training set is achieved. This training process can continue until a target success rate (e.g., 90%, 95%, etc.) of reliable identification of sign types 430 in the training sets is reached. In some implementations, the target success rate can be determined based on a set of testing images previously not seen by MLM-I 320.

Sign type(s) 430 output by MLM-I 320 can be processed by a sign viability filter 440, which can determine a class for each identified candidate sign 422. In some implementations, sign viability filter 440 can include a look-up table of all known, to the processing system, sign types. In some implementations, classification can be performed by sign viability filter 440 in view of both the sign type of candidate sign 422 as well as its mirror image, as described above. As a result, sign viability filter 440 can classify the observed sign among a number of classes. One class, e.g., Class A, can include signs that are image-false. Upon making a determination that candidate sign 422 is image-false, processing of candidate sign 422 can proceed directly to a sign validity prediction block 470 that outputs the determination that candidate sign 422 is real.

Another class, e.g., Class B, can include signs whose mirror image is an image-false sign. Correspondingly, a candidate sign 422 that is classified as a Class B sign, is expected to be a reflection of a real sign located somewhere else in the driving environment. Therefore, upon a determination that candidate sign 422 is a mirror image of an image-false sign, processing can proceed directly to a sign validity prediction block 470, which outputs the determination that candidate sign 422 is an image sign.

A third class, e.g., Class C, can include signs that are image-true. Because image true signs are either symmetric or have a valid mirror image counterpart sign, a candidate sign 422 that is classified as a Class C sign cannot be immediately identified as a real sign or an image sign based on the sign's semantic information alone. Therefore, such a candidate sign is forwarded to spatial validation 450. Additionally, signs that have been classified as Class A signs or Class B signs, but whose sign type 430 has been identified with a confidence level below a certain threshold confidence level, can also be forwarded to spatial validation 450.

Figure 5:
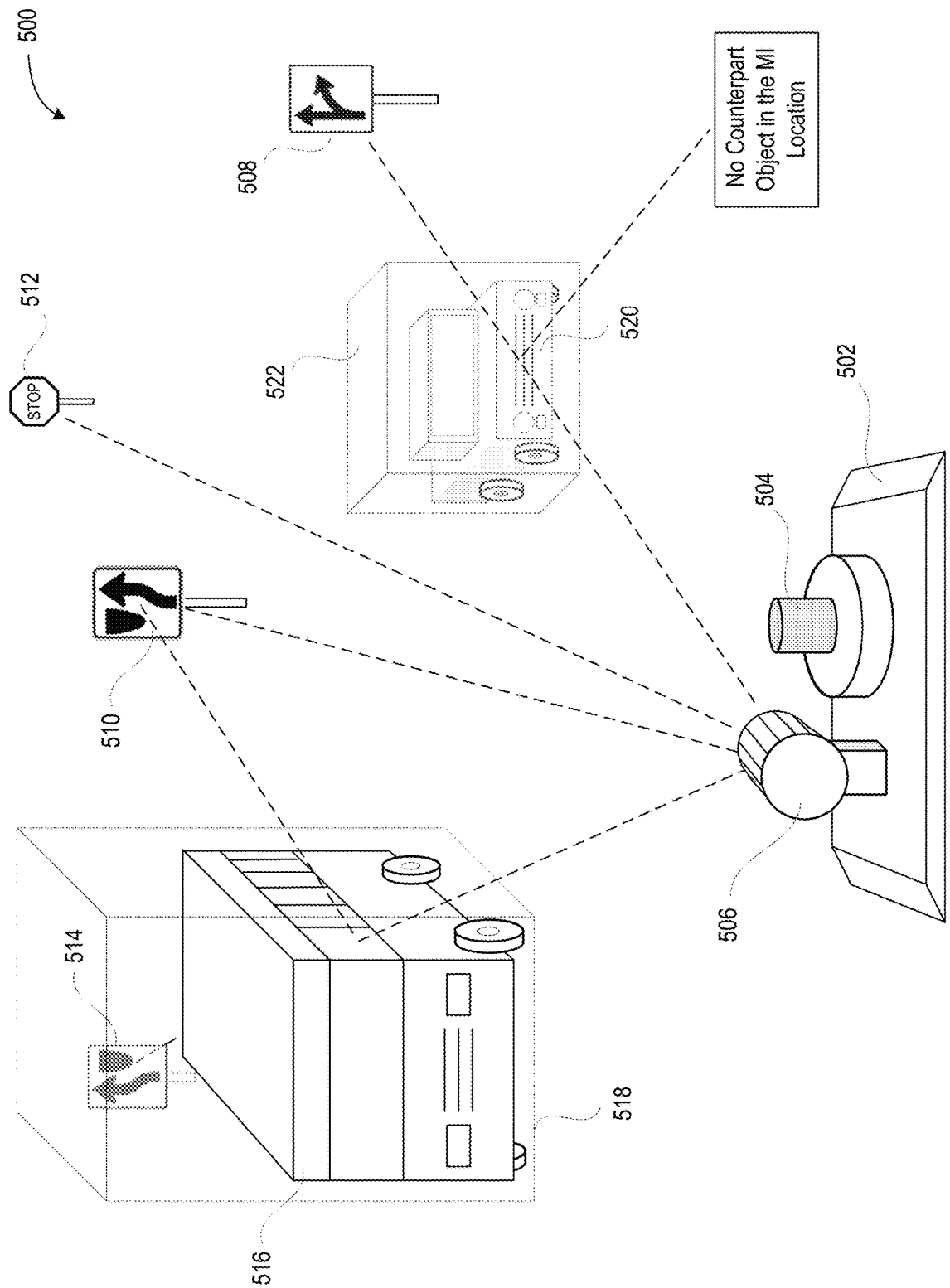
FIG. 5 illustrates schematically a region of a driving environment that includes signs identified and validated using techniques that operate in accordance with some implementations of the present disclosure.

In some implementations, spatial validation 450 can include at least some of the following validation operations: occlusion validation 452, geometry validation 454, and mapping validation 456. In some implementations, some of the validation operations (e.g., mapping validation 456) are not performed. FIG. 5 illustrates schematically a region 500 of a driving environment that includes signs identified and validated using techniques that operate in accordance with some implementations of the present disclosure. FIG. 5 depicts a portion of the AV 502 that supports a lidar 504 (e.g., lidar 112) and a camera 506 (e.g., one of cameras 118). Also depicted are "Go Straight or Right" sign 508, "Keep Right" sign 510, and "Stop" Sign 512. Lidar 504 and camera 506 can detect signs 508, 510, and 512, and can further detect a reflection image of "Keep Right" sign 510 produced by light reflection from a window of a bus 516 and appearing as "Keep Left" candidate sign 514. Candidate sign 514 can be located behind bus 516. Processing by MLM-I 320 and sign viability filter 440 can classify (e.g., with an above-threshold confidence) "Stop" sign 512 as Class A image-false sign and, therefore, identify "Stop" sign 512 as a real sign. On the other hand, MLM-I 320 and sign viability filter 440 can classify both candidate signs 508 and 510, as well as candidate signs 514, as Class C image-true signs and forward the candidate signs 508, 510, and 514 for spatial validation 450.

During occlusion validation 452, each candidate sign can be analyzed and a likelihood that each candidate sign is occluded by other objects can be evaluated. For example, bus 516 can be detected to occlude candidate sign 510 but not candidate sign 514. Occlusion validation 452 can be performed using 3D lidar data, which includes a distance to various lidar return points. Additionally, perception system 130 of the AV can identify clusters of lidar return points (e.g., using various techniques of clustering, including the iterative closest point (ICP) algorithms, statistical Kalman tracking of clusters, etc.) that belong to the same objects and identify the size of the objects. In some implementations, perception system 130 can identify a 3D bounding box 518 that encloses bus 516. Occlusion validation 452 can include determining that a line of sight from camera 506 to a candidate sign, e.g., candidate sign 514, intersects bounding box 518. This can indicate a likely occlusion of candidate sign 514 by bus 516 and favor validation of candidate sign 514 as an image sign.

In some implementations, occlusion validation 452 can include assigning an occlusion score to a candidate sign. In some implementations, occlusion score can be binary, e.g. value 0 indicating no occlusion (no intersection of the ray of light with the bounding box) and value 1 indicating occlusion (intersection of the ray of light with the bounding box). In some implementations, occlusion score can take more than two values and can even be a continuous score. For example, the occlusion value can be higher for those candidate signs that have a line of sight to camera 506 (and lidar 504) with rays that cross the middle of the bounding box and lower for those candidate signs that have a line of sight that passes through an outer region of the bounding box. Such a variable scale of occlusion scores can efficiently address situations of false occlusions. More specifically, lidar-determined bounding boxes can be imprecise. In some instances, the bounding boxes can overestimate the size of the enclosed object. For example, for speed of detection, the perception system 130 can identify bounding boxes whose height is not a precise estimate of the actual height of the object; e.g., as the height of bounding box 518 can be substantially larger than the height of bus 516. Additionally, bounding boxes can miss be agnostic about actual profiles of the objects. For example, as depicted schematically in FIG. 5, the perception system 130 can identify that a car 520 is located between the AV and sign 508 and can further compute a bounding box 522 that encloses car 520. A line of sight that connects camera 506 with sign 508 can intersect bounding box 522 but can pass above the engine compartment where the height of car 520 is smaller than the height of bounding box 522. As a result, based on location and dimensions of bounding box 522 a false occlusion may be predicted. To lessen the likelihood of such instances, an occlusion score for occlusion of candidate sign 508 by car 520 can be lower than the occlusion score for candidate sign 514.

Because occlusion by bounding boxes can have a limited predictive power, occlusion scores, even when high, can be taken into account by a final classifier 460 (as described in more detail below) but may not be fully determinative in identifying candidate signs as real signs or image reflections. Additional processing can be performed as part of geometry validation 454. Geometry validation 454 can determine if there exists, within the driving environment, a mirror image counterpart to a candidate sign 422. Additionally, geometry validation 454 can evaluate if an appropriate object exists in the driving environment that can produce a reflection of that mirror image counterpart, which would appear as candidate sign 422.

Figure 6:
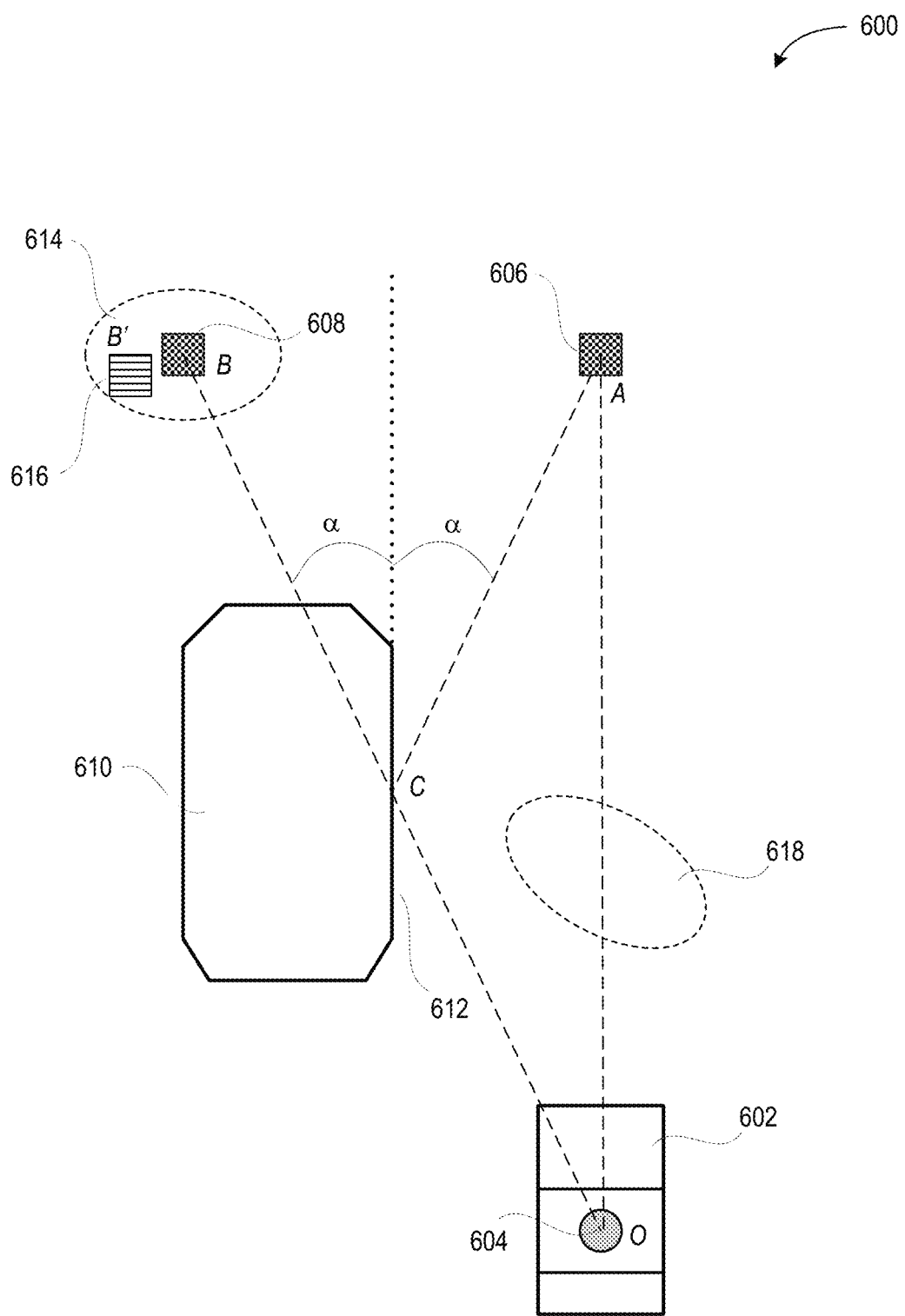
FIG. 6 illustrates schematically an example geometric construction that can be used as part of geometry validation of candidate signs, in accordance with some implementations of the present disclosure.

FIG. 6 illustrates schematically an example geometric construction 600 that can be used as part of geometry validation of candidate signs, in accordance with some implementations of the present disclosure. FIG. 6 depicts AV 602 with a sensing system 604 (depicted with character O) mounted thereon, the sensing system having a lidar receiver and one or more cameras. A candidate sign A 606 can be detected by sensing system 604 and identified, by MLM-I 320 and sign viability filter 440, as an image-true sign. Geometry validation 454 can include identifying, among other candidate signs identified by MLM-I 320, a mirror image candidate sign located elsewhere and belonging to one of the following categories: i) the same type sign as candidate sign A 606, if the latter is mirror-symmetric, or ii) a mirror image of candidate sign A 606, if the latter is asymmetric. For example, a candidate sign B 608 can be identified as a possible mirror image counterpart of candidate sign A 606. (If multiple possible counterparts $B_1$, $B_2$, etc., are identified, the operations described below can be performed for multiple pairs of candidate signs (A, $B_1$), (A, $B_2$), etc., respectively.)

Geometry validation 454 can include identifying a possible object 610 (e.g., a vehicle, a building, a bus stop, or some other object) whose surface 612 can cause a sign reflection. For example, surface 612 can intersect ray OB (as shown) or OA at a location C such that AC is equal to BC (or approximately equal, within a predetermined tolerance) and the angle α between AC and reflecting surface 612 is the same as the angle between BC and reflecting surface 612 (or approximately the same, within a predetermined angular tolerance). Having identified a pair of candidate images A 606 and B 608, and object 610 with a possible reflecting surface 612, geometry validation 454 can include identifying candidate sign A 606 as a real sign and candidate sign B 608 as an image sign. More specifically, a candidate sign that is visible along a line of sight (e.g., line OA) not intersecting the reflecting surface (e.g., reflecting surface 612) can be identified as a real sign and a candidate sign that is visible along a line of sight (e.g., line OB) intersecting the reflecting surface can be identified as an image sign.

In some implementations, a pair of candidate signs need not be positioned with the exact symmetry relative to surface 612. More specifically, the orientation of the reflecting surface may not be known exactly. Furthermore, the reflecting surface can have a degree of curvature. As a result, a pair of candidate signs can be identified as mirror images of each other even if one of the candidates signs, upon reflection in the plane of the reflecting surface, is within a certain region 614 of a predefined size. For example, if the transformation of reflection with respect to surface 612 maps the location of candidate sign A 606 to a location B' 616 that is different from the observed location of candidate sign B 608 but within a tolerance region 614, the two candidate signs A 606 and B 608 can still be determined to be mirror images of each other.

In some implementations, geometry validation 454 can include assigning a geometry score to the candidate signs. In some implementations, a geometry score can be binary; for example, value 0 can indicate that a mirror image counterpart to the candidate sign exists, that an object having a suitable reflecting surface has been identified, and that the object is not within the line of sight between the sensing system (e.g., camera and/or lidar) and the candidate sign. Conversely, value 1 can indicate that a mirror image counterpart to the candidate sign exists, that an object having a suitable reflecting surface has been identified, and that the object is within the line of sight between the sensing system and the candidate sign. Correspondingly, value 0 favors a finding or a real sign and value 1 favors a finding of an image sign. In some implementations, geometry score can take more than two values and can even be a continuous score. For example, if the location and/or orientation of the reflecting surface 612 has been determined with a degree of uncertainty, the geometry score can be reduced from value 1, e.g., proportionally to the degree of uncertainty. Similarly, the geometry score can be reduced proportionally to a degree to which the mutual locations of a candidate sign and its mirror image counterpart deviate from exact geometric images of each other relative to the reflecting surface, e.g., on the distance between location B' 616 and candidate sign B 608.

Referring back to FIG. 4A, in some implementations, mapping validation 456 can include comparing a location and sign type 430 of a candidate sign 422 to signs listed in map information (e.g., map information 124 of FIG. 1). The map information can include locations and sign types of known (e.g., pre-mapped) signs within the driving environment of the AV, e.g., identified via GPS coordinates. Correspondingly, mapping validation 456 can include determining a mapping score for each candidate sign. For example, if a sign of the same sign type as the determined sign type 430 is listed in the map information at the same location, mapping score can be assigned value 0. When no sign of the same sign type is listed in the map information, mapping score can be assigned value 1. In some implementations, mapping score can be a continuous value that increases with the distance between the observed location of candidate sign 422 and the listed mapping location of a sign of the same sign type, so that higher discrepancies in sign locations favor a finding of a sign image and lower discrepancies favor a finding of a real sign.

Occlusion score $S_O$, geometry score $S_G$, and/or mapping score $S_M$ can be provided to a final classifier 460 that can determine a final score $S_F$, which can be any suitable function (linear or nonlinear) of the individual scores, $S_F=F(S_O,S_G,S_M)$. In some example implementations, the final score can be a weighted combination of individual scores, e.g., $$S_F = w_O \cdot S_O + w_G \cdot S_G + w_M \cdot S_M,$$

with weights $w_O$, $w_G$, and $w_M$ representing a relative importance of each score. Specific weight values can be determined based on empirical testing. The weights can be different for different environmental conditions, including different lighting, precipitation, visibility, etc. A sign validity prediction 470 can be determined for each candidate sign based on the final score $S_F$. For example, if a final score $S_F$ meets or exceeds a certain (e.g., empirically determined) threshold score $S_T$, $S_F \geq S_T$, the candidate sign is identified as an image sign (sign reflection). If, the final score is less than the threshold score, $S_F < S_T$, the candidate sign is identifying as a real sign. It should be understood that the linear dependence of the final score on individual scores is intended as illustration only and that numerous other ways of determining a final score can be used instead. Additionally, the individual scores $S_O,S_G,S_M$ do not have to be normalized within the same interval of values, e.g., [0,1], and can vary within individually-selected empirical bounds.

Weighting of individual scores enables efficient and accurate sign identification and validation even when each individual validation score can be imprecise. For example, referring again to FIG. 6, if a mirror image counterpart to a candidate sign is not identified during geometry validation 454, a geometry score of the candidate sign can be set at 0, favoring a finding of a real sign. But in some instances, another object 618 (whose contour is depicted with a dashed oval in FIG. 6) can be blocking the line of sight OA from AV 602 to the real sign (e.g., candidate sign A 606). With the real sign invisible to AV 602, only an image sign (e.g., candidate sign B 608) can be detected by the sensing system of the AV 602, resulting in a low (or zero) geometry score. In such instances, the final score $S_F$ for candidate sign B 608 can still be substantially above 0, since occlusion validation 452 can be capable of identifying that object 610 is occluding candidate sign B 608. Mapping validation 456 can further contribute to increasing the final score $S_F$ by finding that candidate sign 608 is not near a known sign of the same type.

Figure 4B:
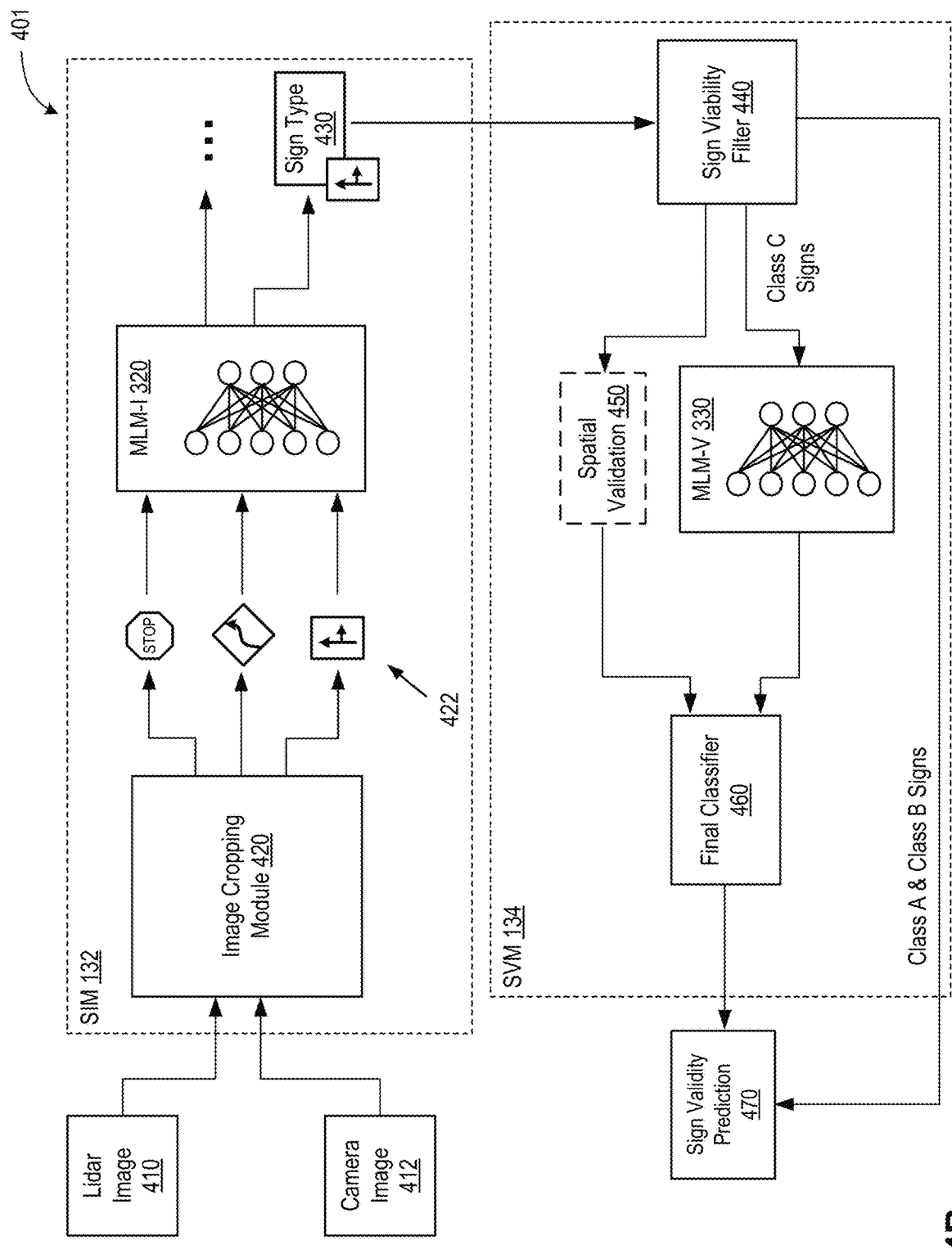
FIG. 4B is a schematic diagram illustrating example sign identification and validation operations that use machine learning models for both sign identification and sign validation, in accordance with some implementations of the present disclosure.

FIG. 4B is a schematic diagram illustrating example sign identification and validation operations 401 that use machine learning models for both sign identification and sign validation, in accordance with some implementations of the present disclosure. In the implementation shown in FIG. 4B, after a pair of signs (e.g., a candidate sign and its mirror image counterpart) are identified, a portion of an image (e.g., both of a lidar image 410 and camera image 412) depicting both signs of the pair can be input into MLM-V 330. For example, an image of a portion of region 500 of the driving environment depicted in FIG. 5 can be input into MLM-V 330, the portion of region 500 including candidate signs 510 and 514 and bus 516. MLM-V 330 can be trained using images of various signs and their reflections from different objects, e.g. vehicles, buildings, bus stops, and the like. MLM-V 330 can output a validation score representative of the likelihood that each one of the candidate signs is a real sign, e.g., real candidate sign 510 can receive validation score 0 and reflection image candidate sign 514 can receive validation score 1. In those instances where both candidate signs are determined to be real, both candidate signs can receive validation score 0. In some implementations, MLM-V 330 can be used as an additional channel that provides scores to final classifier 460, complementing various scores produced by spatial validation 450, as described in detail above. In some implementations, no spatial validation 450 is performed and MLM-V 330 determines the final score.

Figure 7:
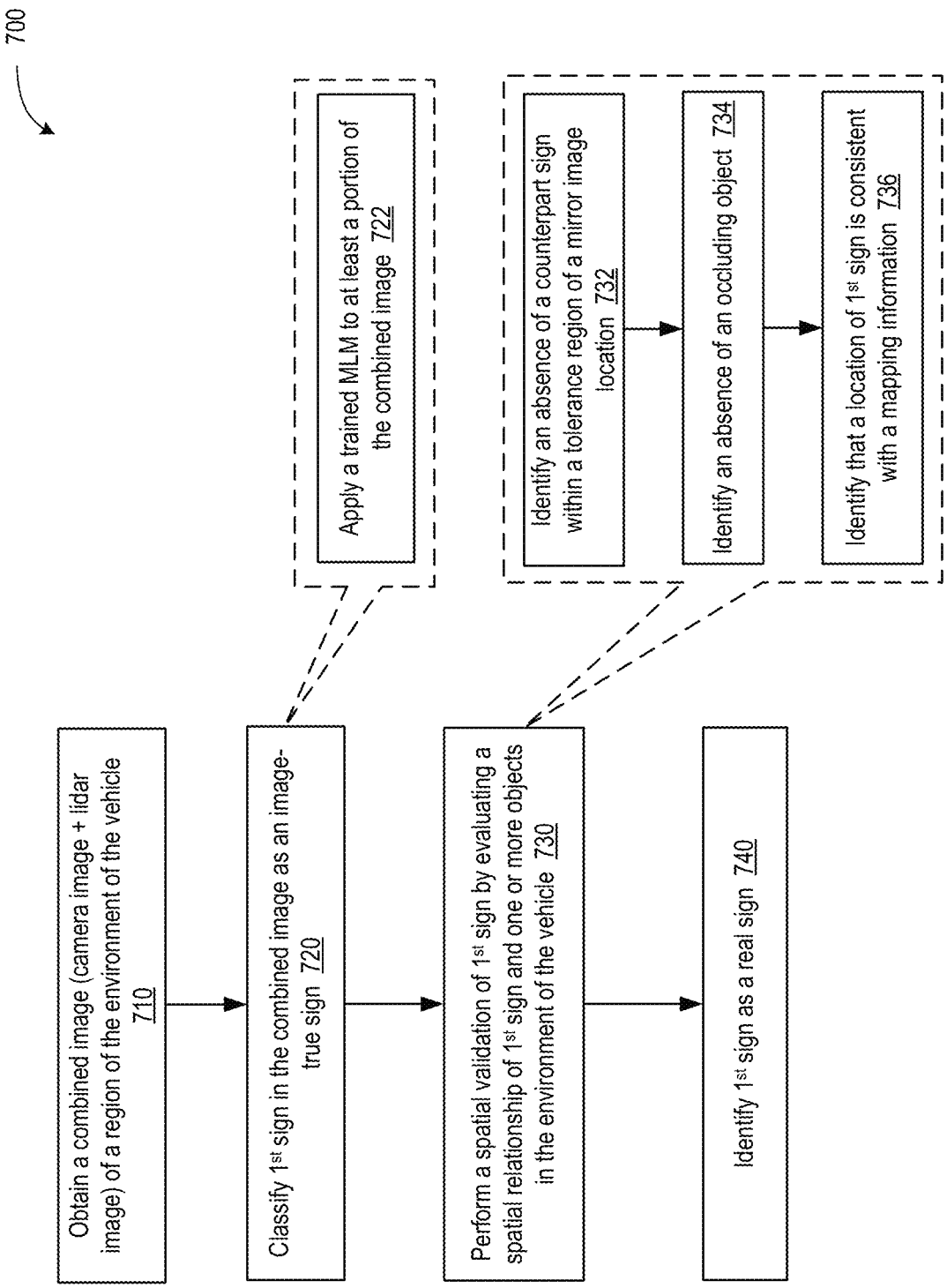
FIG. 7 illustrates an example method of identification and validation of real signs in a driving environment of a vehicle, in accordance with some implementations of the present disclosure.
Figure 8:
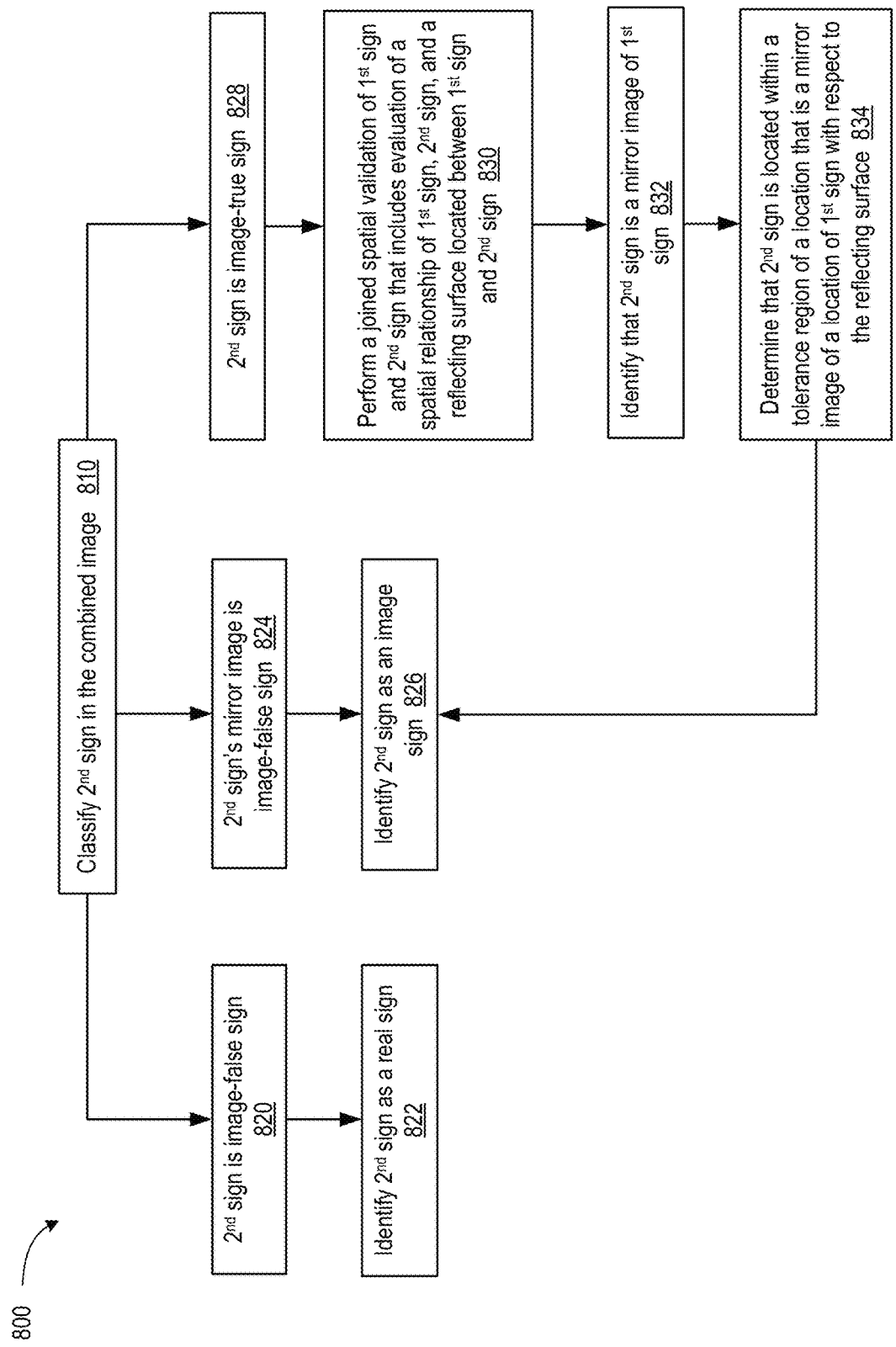
FIG. 8 illustrates an example method of identification of image signs in a driving environment of a vehicle, in accordance with some implementations of the present disclosure.

FIG. 7 and FIG. 8 illustrate example methods 700 and 800 that enable efficient identification and validation of detected signs as real signs or image signs, in accordance with some implementations of the present disclosure. A processing device, having one or more processing units (CPUs), one or more graphics processing units (GPUs), and memory devices communicatively coupled to the CPU(s) and/or GPUs can perform methods 700 and 800 and/or each of their individual functions, routines, subroutines, or operations. Methods 700 and 800 can be directed to systems and components of an autonomous driving vehicle, such as the autonomous vehicle 100 of FIG. 1. The processing device executing methods 700 and 800 can perform instructions issued by various components of the perception system 130 of FIG. 1, e.g., SIM 132 and SVM 134. Methods 700 and 800 can be used to improve performance of the autonomous vehicle control system 140. In certain implementations, a single processing thread can perform methods 700 and 800. Alternatively, two or more processing threads can perform methods 700 and 800, each thread executing one or more individual functions, routines, subroutines, or operations of the methods. In an illustrative example, the processing threads implementing methods 700 and 800 can be synchronized (e.g., using semaphores, critical sections, and/or other thread synchronization mechanisms). Alternatively, the processing threads implementing methods 700 and 800 can be executed asynchronously with respect to each other. Various operations of methods 700 and 800 can be performed in a different order compared with the order shown in FIG. 7 and/or FIG. 8. Some operations of methods 700 and 800 can be performed concurrently with other operations. Some operations can be optional.

FIG. 7 illustrates an example method 700 of identification and validation of real signs in a driving environment of a vehicle, in accordance with some implementations of the present disclosure. In some implementations, the vehicle can be an autonomous vehicle (AV). In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). At block 710, method 700 can include using a sensing system of the vehicle (e.g., sensing system 110 in FIG. 1) to collect camera data, e.g., digital camera images, and a lidar data, e.g., 3D lidar images, depicting a region of an environment of the vehicle. The sensing system can produce a combined image that includes a camera image of the region and a depth information for the region. A combined image should be understood as any association of camera data (e.g., intensities for each of base colors of the camera image) with depth information that references the same locations in space, e.g., using space coordinates, pixel coordinates, etc. In some implementations, the depth information can include lidar data, radar data, stereo image data, ultrasonic data, etc., or any combination thereof. The camera data and the depth information in the combined image can retain their corresponding distinctiveness and are not necessarily blended together (e.g., by combining camera and lidar intensities into a single combined intensity).

At block 720, method 700 can include using a perception system of the vehicle (e.g., perception system 120 of FIG. 1), to classify a first sign in the combined image as an image-true sign. In some implementations, as indicated by block 722 in the callout portion of block 720, classifying the first sign as an image-true sign can include applying a trained MLM to the combined image or to at least a portion of the combined image. More specifically, the perception system can use object recognition software (which can include additional MLMs) to spot depictions of signs in the combined image. Signs can be any traffic signs, information signs, including building and store names, advertisement billboards, or the like. Spotting of depictions of signs in the combined image can be performed using the camera image component of the combined image, or the lidar image component of the combined image, or a combination thereof. After initial spotting of the depictions of signs, the perception system can crop the depictions of spotted signs (candidate signs) from the larger combined image of the region of the environment being imaged and then process the cropped portions using the MLM (e.g., MLM-I 320). The MLM can determine a type of each candidate sign (e.g., "No Parking" sign, "School Zone" sign, "Yield" sign, etc.) to enable classifying each candidate sign among a number of classes.

In some implementations, the perception system can classify a sign as an image-true sign if the sign is of such a type that a mirror image of the sign is a valid (e.g., recognized by traffic laws and regulations) sign, for example, the same sign (in the instances of symmetric signs) or another valid sign (e.g., a left arrow sign is a valid sign that is a mirror image of the right arrow sign). Likewise, a sign can be classified as an image-false sign if the sign is a valid sign but its mirror image is an invalid sign (e.g., "Speed Limit" sign). Conversely, a sign can be classified as a sign whose mirror image is an image-false sign, e.g., as a sign that is invalid but whose mirror image is a valid sign.

At block 730, the perception system can perform a spatial validation of a particular candidate sign, referred to as a first sign below. It should be understood that "first," "second," etc., are intended as identifiers only and do not imply any spatial or temporal order of sign detection. The spatial validation of the first sign can include evaluation of a spatial relationship between the first sign and one or more objects in the region of the environment of the vehicle (e.g., as illustrated in FIG. 6). As depicted by various blocks in the callout portion of block 730, performing the spatial validation of the first sign can include a number of operations. Not all operations need to be performed in every instance of a sign validation, only some of the operations can be performed in specific instances. More specifically, at block 732, the perception system can identify an absence of a mirror image counterpart (to the first sign) located within a tolerance region of a location that is a mirror image of a location of the first sign with respect to a reflecting surface. For example, if the perception system identifies a candidate sign A 605 and further identifies that a mirror image counterpart of candidate sign A 605 is not within the tolerance region 614 around the location that is a mirror image of the location of candidate sign A 605 relative to the reflecting surface 612, this finding can favor identifying that candidate sign A 605 is a real sign.

At block 734, the perception system can identify an absence of an object occluding a location of the first sign from the sensing system of the vehicle. For example, if the perception system identifies that a line of view from sensing system 604 to candidate sign A 605 is unobstructed by other objects, this can favor a finding that candidate sign A 605 is a real sign. As another example, at block 736, the perception system can identify that a location of the first sign is consistent with a mapping information for the region of the environment of the vehicle. For example, the perception system can determine that candidate sign A 606 is of a type that is the same as the type of a sign listed in the mapping information and located within a certain neighborhood of the location of candidate sign A 606. This can favor a finding that candidate sign A 605 is a real sign. In some implementations, operation of block 730 can involve the use of MLM-V 330, as described in relation to FIG. 4B.

At block 740, method 700 can continue with identifying, based on the performed spatial validation performed as part of block 730, that the first sign as a real sign. In some implementations, block 740 can involve operation of final classifier 460, including computing and weighing various scores representative of the performed validation procedures, as described in more detail in relation to FIG. 4A.

FIG. 8 illustrates an example method 800 of identification of image signs in a driving environment of a vehicle, in accordance with some implementations of the present disclosure. Method 800 can include, at block 810, using the perception system of the vehicle to classify a sign (herein referred to as a second sign). In some instances, as indicated by block 820, the perception system can determine that the second sign is an image-false sign. The perception system can then identify (block 822) the second sign as a real sign.

In some instances, as indicated by block 824, the perception system can classify the second sign as a sign whose mirror image is an image-false sign, which indicates that the second sign is a mirror image of a valid sign that does not have a valid mirror image counterpart. As a result, the perception system can identify (block 826) that the second sign as an image sign.

In other instances, as indicated by block 828, the perception system can determine that the second sign in the combined image is an image-true sign. In such instances, the perception system can initiate additional validation of the second sign to determine if the second sign is a real sign or an image sign. For example, at block 830, the perception system can perform a joined spatial validation of the first sign and the second sign. The joined spatial validation can include evaluation of a spatial relationship of the first sign (e.g., candidate sign A 606 in FIG. 6), the second sign (e.g., candidate sign B 608), and a reflecting surface located between the first sign and the second sign (e.g., reflecting surface 612). More specifically, the joined spatial validation can include at least some of the following operations. At block 832, the joined spatial validation can include using the perception system to identify that the second sign is a mirror image of the first sign (e.g., that candidate sign B 608 is a "Left Turn Only" sign and candidate sign A is a "Right Turn Only" sign"). At block 834, the perception system can determine that the second sign is located within a tolerance region of a location that is a mirror image of a location of the first sign with respect to the reflecting surface. For example, the second candidate sign can be located at position B' 616 within the tolerance region 614 drawn around the location (e.g., that of depicted candidate sign B 608) that is a mirror image of the location of candidate sign A 606 with respect to the reflecting surface 612. Based on operations of one or more blocks 828-834, performed as part of the joined spatial validation, the perception system can identify (at block 826) that the second sign is an image sign. In some implementations, one or all operations of the joined spatial validation may not be determinative in identifying whether the second (and/or the first) sign is a real sign or a sign reflection. Instead, the output of a respective operation can be assigned a validation score with the final determination carried out based on the totality of all validations scores, as described in more detail in relation to FIG. 4A.

After identifying that the first sign is a real sign and the second sign is an image sign, the processing system can cause the vehicle control system to ignore the second sign and chart a driving path of the vehicle in view of the location and semantic meaning of the first sign. Any number of additional signs (or pairs of signs) can be processed, e.g., sequentially (in pipelined fashion) or in parallel, using methods 700 and 800 or methods that are similar to methods 700 and 800.

Figure 9:
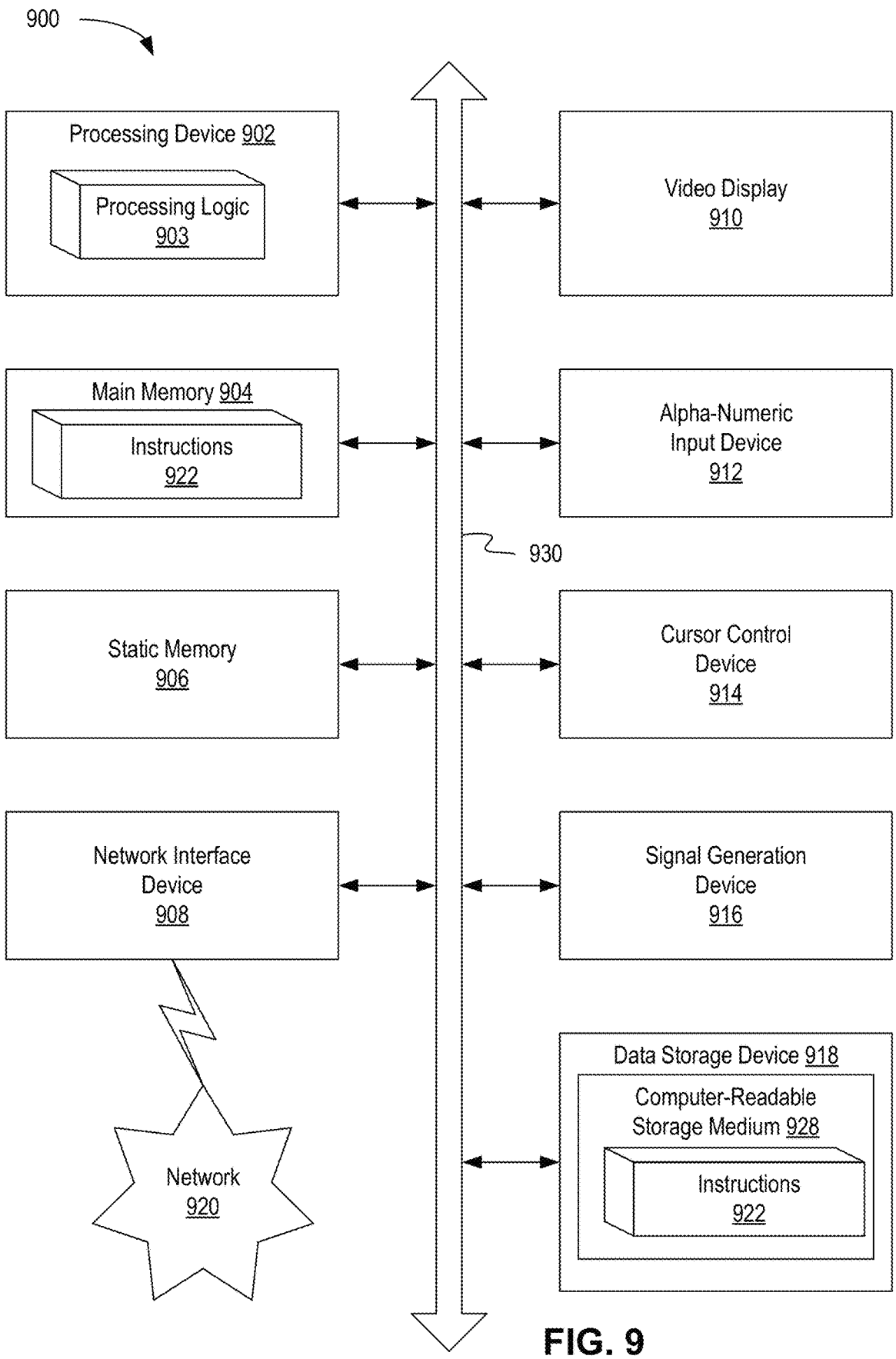
FIG. 9 depicts a block diagram of an example computer device capable of enabling efficient identification and validation of real and images signs in autonomous driving environments, in accordance with some implementations of the present disclosure.

FIG. 9 depicts a block diagram of an example computer device 900 capable of enabling efficient identification and validation of real and images signs in autonomous driving environments, in accordance with some implementations of the present disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing methods 700 and 800 of identification and validation of real and image signs in a driving environment of an autonomous vehicle.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing methods 700 and 800 of identification and validation of real and image signs in a driving environment of an autonomous vehicle.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
    a sensing system of a vehicle, the sensing system configured to:
        obtain a combined image comprising a camera image of a region of an environment of the vehicle and a depth information for the region of the environment of the vehicle, wherein the depth information comprises at least one of a lidar data, a radar data, a stereo image data, or an ultrasonic data; and
    a perception system of the vehicle, the perception system configured to:
        classify a first sign in the combined image as an image-true sign, wherein to classify the first sign as an image-true sign, the perception system is to identify the first sign as a sign whose mirror image corresponds to a valid sign type;
        perform a spatial validation of the first sign, the spatial validation comprising evaluation of a spatial relationship of the first sign and one or more objects in the region of the environment of the vehicle; and
        identify, based on the performed spatial validation, the first sign as a real sign.

2. The system of claim 1, wherein to classify the first sign as an image-true sign, the perception system of the vehicle is to apply a trained machine-learning model to at least a portion of the combined image.

3. The system of claim 1, wherein the perception system is further configured to:
    classify a second sign in the combined image as an image-false sign; and
    identify the second sign as a real sign.

4. The system of claim 3, wherein to classify the second sign as an image-false sign, the perception system is to identify the second sign as a sign whose mirror image corresponds to an invalid sign type.

5. The system of claim 1, wherein the perception system is further configured to:
    classify a second sign in the combined image as a sign whose mirror image is an image-false sign; and
    identify the second sign as an image sign.

6. The system of claim 1, wherein the perception system is further configured to:
    classify a second sign in the combined image as an image-true sign;
wherein to perform the spatial validation of the first sign, the perception system is to:
    perform a joined spatial validation of the first sign and the second sign, the joined spatial validation comprising evaluation of a spatial relationship of the first sign, the second sign, and a reflecting surface located between the first sign and the second sign; and identify, based on the performed joined spatial validation, the second sign as an image sign.

7. The system of claim 6, wherein to perform the joined spatial validation, the perception system is further configured to:

identify that the second sign is a mirror image of the first sign; and determine that the second sign is located within a tolerance region of a location that is a mirror image of a location of the first sign with respect to the reflecting surface.

8. The system of claim 1, wherein to perform the spatial validation of the first sign, the perception system is further configured to:

identify an absence of a counterpart sign to the first sign located within a tolerance region of a location that is a mirror image of a location of the first sign with respect to a reflecting surface.

9. The system of claim 1, wherein to perform the spatial validation of the first sign, the perception system is further configured to:

identify an absence of an object occluding a location of the first sign from the sensing system of the vehicle.

10. The system of claim 1, wherein to perform the spatial validation of the first sign, the perception system is further configured to:

identify that a location of the first sign is consistent with a mapping information for the region of the environment of the vehicle.

11. A system comprising:

a sensing system of a vehicle, the sensing system configured to:

obtain a first data comprising a lidar data and a camera data for a first portion of a driving environment of the vehicle, the first portion depicting a first candidate sign; and obtain a second data comprising a lidar data and a camera data for a second portion of the driving environment, the second portion depicting a second candidate sign; and a perception system configured to:

process, using a machine-learning model (MLM), the first data to determine a first sign type of the first candidate sign;

process, using the MLM, the second data to determine a second sign type of the second candidate sign;

determine, based on the first sign type and the second sign type, that the first candidate sign is a mirror image of the second candidate sign;

responsive to determining that at least one of the first sign or the second sign is an image-true sign, identify a reflecting surface located between a second candidate sign and the sensing system of the vehicle, wherein to determine that a sign is an image-true sign, the perception system is to identify the sign as a sign whose mirror image corresponds to a valid sign type;

identify that the second candidate sign is located within a tolerance region of a location that is a mirror image of a location of the first candidate sign with respect to the reflecting surface; and determine that the first candidate sign is a real sign and the second candidate sign is an image sign.

12. The system of claim 11, wherein the first candidate sign and the second candidate signs correspond to one or more valid traffic sign types.

13. The system of claim 12, further comprising an autonomous vehicle control system configured to ignore the second candidate sign and chart a driving path of the vehicle in view of the first candidate sign.

14. A method comprising:

obtaining, using a sensing system of a vehicle, a combined image that comprises a camera image of a region of an environment of the vehicle and a depth information of the region of the environment of the vehicle, wherein the depth information comprises at least one of a lidar data, a radar data, a stereo image data, or an ultrasonic data;

classifying a first sign in the combined image as an image-true sign, wherein classifying the first sign as an image-true sign the perception system comprises identifying the first sign as a sign whose mirror image is a valid sign;

performing a spatial validation of the first sign, the spatial validation comprising evaluation of a spatial relationship of the first sign and one or more objects in the region of the environment of the vehicle; and identifying, based on the performed spatial validation, the first sign as a real sign.

15. The method of claim 14, wherein classifying the first sign as an image-true sign comprises:

applying a trained machine-learning model to at least a portion of the combined image.

16. The method of claim 14, wherein classifying the first sign as an image-true sign comprises identifying the first sign as a sign whose mirror image corresponds to a valid sign type, the method further comprising:

classifying a second sign in the combined image as an image-false sign by identifying the second sign as a sign whose mirror image corresponds to an invalid sign type; and identifying the second sign as a real sign.

17. The method of claim 14, further comprising:

classifying a second sign in the combined image as an image-true sign;

wherein performing the spatial validation of the first sign comprises:

performing a joined spatial validation of the first sign and the second sign, the joined spatial validation comprising evaluation of a spatial relationship of the first sign, the second sign, and a reflecting surface located between the first sign and the second sign; and identifying, based on the performed joined spatial validation, the second sign as an image sign.

18. The method of claim 17, wherein performing the joined spatial validation comprises:

identifying that the second sign is a mirror image of the first sign; and determining that the second sign is located within a tolerance region of a location that is a mirror image of a location of the first sign with respect to the reflecting surface.

19. The method of claim 14, wherein performing the spatial validation of the first sign comprises:

identifying an absence of a counterpart sign to the first sign located within a tolerance region of a location that is a mirror image of a location of the first sign with respect to a reflecting surface.

20. The method of claim 14, performing the spatial validation of the first sign comprises:

identifying an absence of an object occluding a location of the first sign from the sensing system of the vehicle.

* * * * *